Aug. 6, 1957

C. B. DALE 2,801,811

TAPE REEL LATCH

Filed July 20, 1954

INVENTOR
COLIN B. DALE
BY [signature]
ATTORNEY

United States Patent Office 2,801,811
Patented Aug. 6, 1957

2,801,811

TAPE REEL LATCH

Colin B. Dale, Oak Park, Ill., assignor to Webcor, Inc., a corporation of Illinois Application July 20, 1954, Serial No. 444,606

7 Claims. (Cl. 242—74.1)

This invention relates to new and useful improvements in devices for latching the end of a magnetic sound recording tape or similar elongated medium to a reel.

According to the present invention, the winding surface, i. e. the hub of the reel has an opening with which a latching head cooperates. The tape or the like is placed on the hub over the opening, whereupon the head is pressed into the opening with the tape so as to anchor it against displacement. The head and the cooperating surfaces of the hub are so shaped as to anchor the tape firmly without cutting or breaking it.

The invention provides for the operation of the latching head from outside the reel flange, preferably by means of a slide in response to whose displacement the head can be moved in and out of the opening.

The preferred embodiment of the device consists of a latching head projecting from one end of the slide which is slidably and pivotally mounted in an opening of one of the reel flanges. When the slide is pushed in towards the center of the reel, the head will wedge the tape into the hub opening and will be held in that position by virtue of frictional engagement between the slide and the reel. When the slide is moved out towards the periphery of the reel, the head will first free the tape section, and then give free access for another tape to the hub, because the slide is tipped about its pivot and moves the head out of the space between the reel flanges.

The precise nature of the invention will more clearly appear from the appended claims and a detailed description and illustrative drawings, in which:

Figure 1:
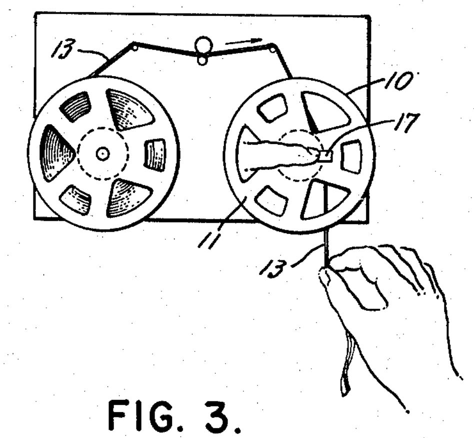
Fig. 1 is a top view of a reel equipped with the novel latch as it might be mounted for use in a sound tape recorder and illustrating the manner of securing the tape thereto.
Figure 2:
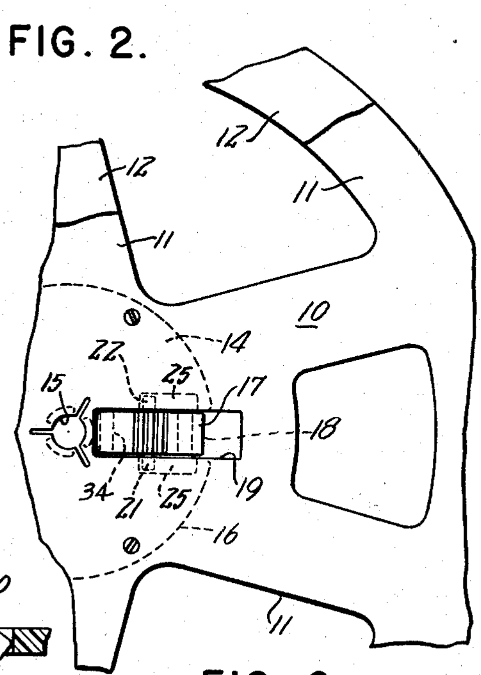
Fig. 2 is an enlarged fragmentary plan view of a reel embodying the moved latch, and showing the same in closed, tape secured position.

The reel designated by the reference number 10 has two flanges 11 and 12 of any suitable material such as plastic or metal, so spaced as to accommodate an elongated medium such as magnetic recording tape 13. The two flanges 11 and 12 are suitably secured to a hub 14 which is centrally perforated at 15 affording a rotary mounting for the reel 10.

The hub 14 may be a solid or hollow cylindrical body to the end faces of which flanges 11 and 12 are fastened, and having a smooth peripheral surface 16 on which the tape 13 may be wound.

The end of the tape 13 when applied to the hub 14 is latched thereto by means of a device comprising a flat slide member 17 which is operable by the finger of one hand from outside flange 11 with the reel 10 mounted on the recording device. The slide may also be of metal or plastic and fits within the opening 19 cut in flange 11. Near its outer end, the slide 17 is provided with a latching or clamping head 20 forming a right angle with the slide. Near its center the slide has pins 21, 22 projecting from its opposite sides, and is suitably scored or serrated on its upper side and rounded on one end edge as indicated at 23 and 24, respectively. The pins 21, 22 ride within pockets 25 formed in hub 14 on the two sides of the cut-out 18 and in the underside of flange 11.

Figure 3:
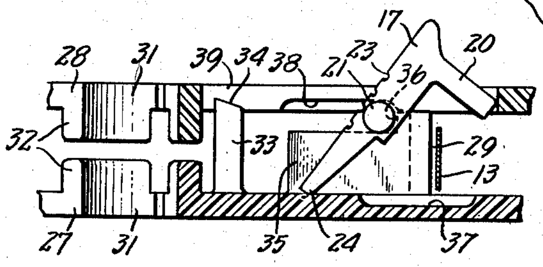
Fig. 3 is a fragmentary cross sectional view of a reel embodying the novel latch and illustrating the same in its first or open position with a tape in position on the winding hub of the reel.
Figure 4:
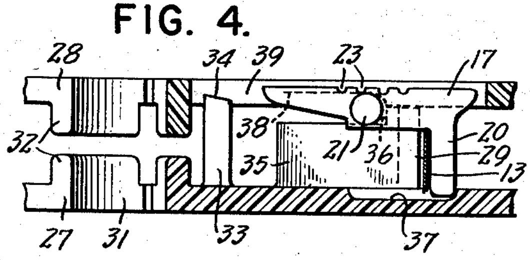
Fig. 4 is a view similar to Fig. 3 illustrating the novel latch in its second position with respect to the reel hub and tape, before the latch is finally moved toward the center of the reel.
Figure 5:
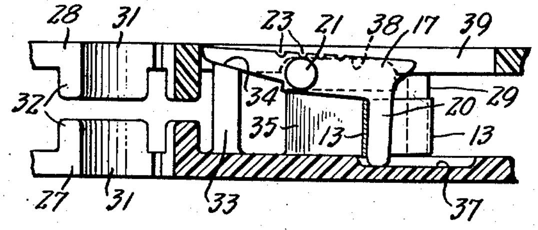
Fig. 5 is a similar view illustrating the novel latch in its third or final position with the tape clamped between the latch and reel hub.

The rounded edge 24 formed on one end of the slide member 17 coacts with a shoulder or ledge 34 formed at the top of post 33 at the inner or bottom end of the notch 18 whereby the inner end of the slide member 17 is cammed upwardly, upon movement to its closed position to maintain the clamping action of its head 20 on the tape 13, as exemplified by Figs. 3, 4 and 5.

As clearly shown in Figs. 3 through 6, the reel generally indicated at 10, may be formed by a pair of molded complementary half-sections each comprising an annular flange 27 and 28, an angularly spaced, arcuate hub forming projections 29 and 30 respectively, the projections 29 and 30 having an outer diameter such that the hub portions 30 will telescope within the hub portions 29 when the half-sections 27 and 28 are suitably secured together to form the reel 10.

Figure 6:
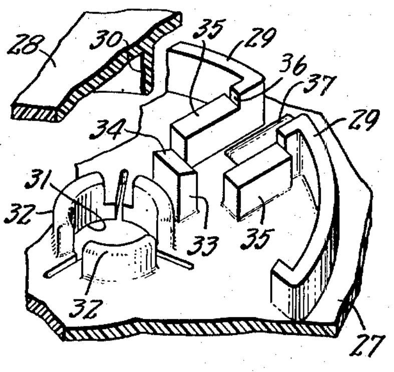
Fig. 6 is a fragmentary perspective view of the hub portion of a complementary half section of a reel as viewed from its inner side and illustrating the internal projections and notch with which the latch cooperates.
Figure 7:
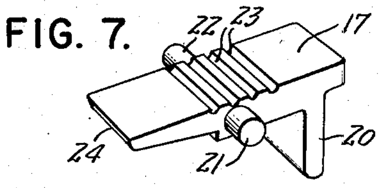
Fig. 7 is a perspective view of the latch member per se.

As best shown in Fig. 6, the central portion of each of the half-sections 27 and 28, is also provided with a central opening 31 and a plurality of relatively small, angularly spaced, arcuate projections 32, forming a bearing for mounting the completed reel.

The half-section 27 is further provided, within its hub forming projections 29, with a projection or post 33 having a sloping top face 34, and a pair of oppositely disposed projections or posts 35, forming a continuation of two adjacent ends of two of the hub forming projections 29, whereby to provide bearing pads for a slide member 17.

As clearly shown in Fig. 6, the posts 35 project from the section 27 to a height less than the arcuate hub forming projections 29 whereby to provide a pair of aligned shoulders 36 thereon adapted to engage the pins 21 and 22 of the slide member 17, whereby to limit outward movement of the slide member 17 when in the position shown in Fig. 4, a suitable recess being provided in the half-section 27, as indicated at 37, to provide clearance for the outward swinging movement of the head 20 on the slide member 17.

As shown in Figs. 3, 4 and 5, the pivot pins 21 and 22 on the slide member 17, have bearing contact with the top faces of the posts 35, provided on the half-section 27, and a pair of pockets 38 or 25 formed in the opposite side margins of a rectangular opening 39 or 19, formed in the half-section 28 to accommodate the slide member 17 including its movement into open and closed positions.

When it is desired to fasten the end of a tape 13 to the hub of reel 10, the slide member 17 is pulled out, i. e. away from its central opening by engaging with a finger of one hand the serrations 23 and sliding pins 21, 22 within their respective pockets. As the rounded end 24 leaves the ledge or shoulder 34 of post 33, the inner end of the slide member 17 will tip into the opening 19 or 39 and, the slide 17 by pivoting on pins 21, 22, its outer end with locking head 20 will rise out of the opening 19 or 39 so as to clear the space between flanges 11 and 12 or joined half sections 27 and 28. The slide is then pulled out as far as the pockets 25 or shoulders 36 allow the pins 21, 22 to move.

This may be considered the first position of the device in which the tape end grasped between the thumb and index finger of the other hand may be pulled against the outer surface of the hub 14 or 29 and over the notch 18 or space between the two hub forming projections 29 which terminate in the posts 35 with which the head 20 of slide 17 cooperates.

The slide is then rotated on its pivot so that the head 20 is over the outside of the tape throughout its width. This is the second position of the device in which the slide 17 lies horizontal and is then pushed inward until its inner end is cammed up by engagement with top face 34 of post 33. During this inward movement the head will pull a section of tape 13 between the opposite outer edges of the notch 18 or the ends of the two hub forming projections 29 which terminate in the bearing posts 35, thus anchoring it against withdrawal. This is the third position of the device.

It will be noted that the latching device requires no springs, screws or rivets for mounting it on reels customarily employed in tape recorders and the like, and that by suitably proportioning and shaping the latching head 20 and the cooperating surfaces of hub 14 or 29, the tape will not be torn as a result of the movement of the latching device into its three positions.

While the invention has been illustrated and described with respect to a preferred embodiment thereof, it is to be expressly understood that various changes and modifications may be made therein without departing from the inventive concept underlying the same. Therefore, the invention is not to be limited except insofar as is necessitated by the prior art and the scope of the appended claims.

I claim:

1. A device for latching the end of tape to the inside or hub portion of a reel on which the tape is wound between the flange portions of the reel, said device comprising a flat slide longitudinally movable within an opening in a reel flange and the hub, the surface of the slide being partly roughened and lying flush with the outside surface of the flange, pivot pins projecting from the sides of said slide midway between the inside and outside ends of the slide and into pockets formed in the hub in communication with the opening therein, said pockets limiting the longitudinal movement of the slide from one to the opposite end of said opening, a tape locking head projecting from the outside end of the slide, the length of said head being the same as the spacing between the flanges and the width such as to allow movement into and out of the opening in the hub portion, a cam within the hub portion cooperating with a rounded edge of the lower face of the inside slide and frictionally to hold the slide in its inside end position, the depth of the opening in the hub adjacent said cam being such as to allow the slide to pivot about said pins when the inside end of the slide is moved away from the cam, so that said inside end may be tilted into the opening and the outside end may correspondingly rise until the head frees the entrance into the opening between the flanges.

2. In a device for latching the end of a windable elongated medium to the hub of a reel on which the medium is wound between a pair of confining reel flanges, the combination including an opening in the hub projecting inwardly from its periphery, an opening in one of the flanges aligned substantially with the opening in the hub, a latch aligned substantially with said hub and flange openings comprising a slide having projecting therefrom a latching head adapted to be manipulated in and out of said hub opening, said latch being manipulatable through said flange opening, pivot pins projecting transversely from said latch, supporting means in said hub opening for slidably and pivotally supporting said latch, a pocket adjacent each side of said hub opening and into which the supported pivot pins project, the length of the pockets being sufficient to effect opening and closing of the latch in said hub opening, a cam post near the bottom of said hub opening for camming and frictionally holding said slide to effect latching of said head in the hub opening.

3. In a device for latching the end of a record tape to the hub of a reel on which the medium is wound between a pair of confining reel flanges, the combination including an opening in the hub projecting inwardly from its periphery, an opening in one of the flanges aligned substantially with the opening in the hub, a latch aligned substantially with said hub and flange openings comprising a slide having projecting therefrom a latching head adapted to be manipulated in and out of said hub opening, said latch being manipulatable through said flange opening, bearing pads in said hub opening for slidably and pivotally supporting said latch, a pocket adjacent each side of said hub opening and into which the supported pivot pins project, the length of the pockets transverse the pins being sufficient to effect opening and closing of the latch in said hub opening, a cam post near the bottom of said hub opening for receiving and frictionally holding said slide to effect latching of said head in the hub opening and a recess in the hub below the head of the latch of sufficient depth to enable the slide to pivot about said pins when the slide is out of camming position, whereby the latch head may be pivoted above the hub opening thereby enabling the feeding in of record tape to be latched.

4. In a device for latching the end of a windable elongated medium to the hub of a reel on which the medium is wound between a pair of confining reel flanges, the combination including an opening in the hub projecting inwardly from its periphery, an opening in one of the flanges aligned substantially with the opening in the hub, a latch aligned substantially with said hub and flange openings comprising a slide having projecting therefrom a latching head adapted to be manipulated in and out of said hub opening, said latch being manipulatable from the outside through said flange opening, pivot means projecting transversely from said latch, supporting means in said hub opening for slidably supporting said latch for pivotal movement about the axis defined by said pivot means, said pivot means defining an axis of rotation perpendicular to the axis of rotation of said reel and means near the bottom of said hub opening for receiving and frictionally holding said slide upon slidable movement to a predetermined position relative thereto to effect latching of said head in the hub opening.

5. In combination with a reel having a hub and reel flanges for receiving a flexible, elongated medium to be wound on the reel, a latch including a manually operable slide having a camming end, an opposite end carrying a latch head, a pair of pivot pins aligned coaxially between said ends, said hub defining an opening and one of said flanges defining an opening substantially in register with said hub opening, supporting means in said hub opening for slidably supporting said latch for pivotal movement about an axis defined by said pivot pins and perpendicular to the axis of rotation of said reel and means adapted to cammingly engage with said first end of said latch to maintain said latch in position for frictionally gripping an end of said medium.

6. In combination with a reel having a hub and reel flanges for receiving a flexible, elongated medium to be wound on the reel, a latch including a manually operable slide having a camming end, an opposite end carrying a latch head, a pair of pivot pins aligned coaxially between said ends, said hub defining an opening and one of said flanges defining an opening substantially in register with said hub opening, supporting means in said hub opening for slidably supporting said latch for pivotal movement about an axis defined by said pivot pins and perpendicular to the axis of rotation of said reel and a post having a bevelled upper surface adapted to cammingly engage with said camming end to maintain said latch in position for frictionally gripping an end of said medium, said hub being contoured to coact with said latch head in accomplishing said gripping action.

7. In a device for latching the end of a windable elongated medium to the hub of a reel on which the medium is wound between a pair of confining reel flanges, the combination including an opening in the hub projecting inwardly from its periphery, an opening in one of the flanges aligned substantially with the opening in the hub, a latch aligned substantially with said hub and flange openings including a latching head adapted to be manipulated in and out of said hub opening, said latch being manipulatable from the outside through said flange opening, said latch being mounted in said reel for pivotal movement about an axis perpendicular to the axis of said reel, and means near the bottom of said hub opening for frictionally holding said head in the hub opening for engagement of the medium therein, said latch being movable slidably into and out of holding relationship with said means.

References Cited in the file of this patent

UNITED STATES PATENTS

| | | |
|---|---|---|
| 331,956 | Ford | Dec. 8, 1885 |
| 793,672 | Lyter | July 4, 1905 |
| 1,835,479 | Faunce | Dec. 8, 1931 |
| 1,838,432 | Mitchell | Dec. 29, 1931 |
| 1,890,823 | Nuhring | Dec. 13, 1932 |
| 2,640,659 | Biko et al. | June 2, 1953 |